US005875432A

United States Patent [19]

Sehr

[11] Patent Number: 5,875,432

[45] Date of Patent: Feb. 23, 1999

[54] COMPUTERIZED VOTING INFORMATION SYSTEM HAVING PREDEFINED CONTENT AND VOTING TEMPLATES

[76] Inventor: Richard Peter Sehr, 2276 Creek Bed Ct., Santa Clara, Calif. 95054

[21] Appl. No.: 802,163

[22] Filed: Feb. 15, 1997

Related U.S. Application Data

[63] Continuation of Ser. No. 286,215, Aug. 5, 1994.

[51] Int. Cl.[6] ............................ G06F 17/60; G07C 13/00

[52] U.S. Cl. .......................... 705/12; 434/306; 235/50 A; 235/50 B; 235/386

[58] Field of Search .................................. 705/1, 12, 41; 434/306; 235/51, 50 R, 50 A, 50 B, 54 F, 56, 57, 386

[56] References Cited

U.S. PATENT DOCUMENTS

| | | | |
|---|---|---|---|
| 4,641,240 | 2/1987 | Boram | 364/409 |
| 4,649,264 | 3/1987 | Carson | 235/54 R |
| 4,774,665 | 9/1988 | Webb | 364/409 |
| 4,961,229 | 10/1990 | Takahashi | 395/2.55 |
| 5,056,086 | 10/1991 | Libonati | 370/62 |
| 5,189,288 | 2/1993 | Anno et al. | 235/386 |
| 5,218,528 | 6/1993 | Wise et al. | 364/409 |
| 5,278,753 | 1/1994 | Graft, III | 364/409 |
| 5,377,099 | 12/1994 | Miyagawa | 364/409 |
| 5,400,248 | 3/1995 | Chisholm | 364/409 |
| 5,412,727 | 5/1995 | Drexler et al. | 380/24 |
| 5,497,318 | 3/1996 | Miyagawa et al. | 364/409 |
| 5,583,329 | 12/1996 | Davis, III et al. | 235/50 A |

OTHER PUBLICATIONS

Everest: *Database Management* (textbook); published 1986 by McGraw–Hill, Inc., p. 746 [single page cited].

Microsoft Press Computer Dictionary, $2^{nd}$ Edition, published 1993 by Microsoft Press, p. 363.

*Primary Examiner*—Joseph Thomas

[57] ABSTRACT

A computerized voting information system that encompasses one or more voting stations, at least one tabulation center and certification center, and a plurality of voters so as to automatically verify, manipulate, interchange, and manage all data and information that is needed by the voting stations to determine if a particular voting card is authentic and a voter is entitled to cast his/her vote, by tabulation centers to perform the tabulation of the casted votes, by certification centers to guarantee the authenticity of the voting cards and the legitimacy of the card holders, and by voters to prove their identity and voting eligibilities.

19 Claims, 9 Drawing Sheets

COMPUTERIZED VOTING INFORMATION SYSTEM HAVING PREDEFINED CONTENT AND VOTING TEMPLATES

This is a continuation of application Ser. No. 08/286,215 filed Aug. 05, 1994

This invention relates to a computerized voting information system and more particularly to the value-added manipulation of data and information that relates to the identification of voters, certification of voting cards, and casting, collecting and tabulation of the casted votes.

BACKGROUND OF THE INVENTION

The computerized voting information system, which includes means to automatically verify, collect and interchange voting data and information, encompasses networked hardware components and distributed software programs and will be used by a variety of voting entities in connection with the process of certifying voters, determining the eligibility of voters, compiling and tabulating the casted votes, and providing a secure operations scheme for the voting system.

The intended purpose of the invention is to help solve several problems that are experienced by our society with respect to the voting process: low attendance rates, increasing administrative & operations costs, time consuming tabulation tasks, inconvenience for voters, lost time from work, rigid voting guidelines, and inadequate security protection. This invention provides solutions to these problems while automating the operational tasks that are associated with the voting process, streamlining the activities of certifying all voters, and making the same and most updated data and information available to all voting entities and related representatives in a real-time manner, whenever requested and/or any voting activity was performed with respect to that data and information. As evidence of the date of conception of this invention, the appropriate Disclosure Document No. 317274 was forwarded by the inventor Richard P. Sehr on Sep. 8, 1992 to the U.S. Patent and Trademark Office.

Heretofore, a variety of voting machines and systems, such as in U.S. Pat. No. 4,641,240 issued to R. F. Shoup Corporation, in U.S. Pat. No. 4,774,665 granted to Data Information Management Systems, Inc., in U.S. Pat. No. 5,189,288 issued to Texas Instruments Incorporated, in U.S. Pat. No. 5,218,528 granted to Advanced Technological Systems, Inc. and in U.S. Pat. No. 5,278,753 which was issued to Charles V. Graft, III, have been proposed. These proposals relate to a variety of specialized, dedicated voting apparatus or integrated systems settings that still rely on the existing paper-based voting environment or centralized, on-line networks.

None of these systems of the prior art, however, provide an effective solution to the problems of how to enlist the majority of eligible voters during election years and/or other voting events, to control the costs associated thereof, and to implement cost efficient security schemes. The limitations of these systems center around the fact that these systems are merely an efficient enhancement to the existing voting environment with hardware apparatus, which are dedicated to a particular voting task, or with on-line systems solutions, which lead to ever increasing communications costs. The systems proposals of the prior art also do not address the questions of (1) What specific cost savings do the systems facilitate, (2) How the systems will function in a stand alone configuration, (3) How the systems will interface with incompatible, proprietary platforms, (4) How and when the systems will handle the exchange of data and information in a real-time manner, (5) What are the privacy concerns and security requirements that are needed, and (6) How the systems will adopt to future needs and developments. Accordingly, there still is a need for a system that provides answers to these issues.

BRIEF SUMMARY OF THE INVENTION

This invention provides a method of constructing, and a system comprising, a functional framework, operational structure, and systems architecture for an integrated, multipurpose voting information system. The preferred embodiment of the present invention includes voting cards, a database scheme and computerized means for performing the collecting, verification, manipulation, and management of voting data and related information with respect to a voter that wants to cast a vote.

The voting cards, which will be issued to the individual voters as personal identification devices (i.e. as a voting pass/ballot), are represented by “smart cards” that have a shape similar to plastic bankcards, but with silicon chips and software embedded into the card package. The smart voting card will identify the rightful cardholder and guarantee the voting eligibility of that particular individual when arriving for voting purposes. The implementation of the voting cards as pocket-sized computers allows the voter’s card to operate within a stand alone system, fully integrated systems environments, or both, as well as with proprietary, incompatible system platforms. The database scheme facilitates the integration and networking of the voters and all voting entities within a single system so as to allow a real-time interaction and information exchange between all systems components while operating in a distributed, decentralized processing environment. The individual databases contain the voting data, including voting eligibilities, security information, casted votes and overall terms and conditions that are related to the particular voting campaigns, as well as the demographics data and related information that relates to a particular voter.

Accordingly, the present invention provides a secure, automated, interactive and integrated voting information system which includes means for identifying and recognizing the voters, authenticating and certifying the voting cards, verifying the cardholder’s voting eligibility, casting and collecting of votes, tabulating and manipulating the voting data and other voting-related information, downloading incremental updates automatically to all databases, linking proprietary computing platforms and stand alone off-line settings, and means for implementing secure protection schemes for computerized voting information.

Based upon the objects and features of the invention, advantages of this invention will include reduced administrative costs through automated vote entry and retrieval, computerized manipulation of information, conformity to pre-defined procedures as well as reduced paperwork, improved productivity through availability of complete and accurate voting information, elimination of redundant data, use of pre-designed templates and PC-window screens as well as implementation of knowledge-based techniques, and better quality of voting results through increased voter participation, faster collection and tabulation of votes, more streamlined operations as well as immediate availability of up-to-date voting information.

BRIEF DESCRIPTION OF THE DRAWINGS

The following is a list of the terms utilized throughout the descriptions of this invention:

LABEL=a descriptive alphanumeric term, or an abbreviation thereof, to designate the contents of a box that follows that label.

BOX=a space allocated to display conventional symbols that are used in computer work onto computer terminal screens, including any alphabetic or numerical data.

BUTTON=a key similar to a push-button switch or a functional key that, when selected, initiates the implementation of one or more operational tasks the button is programmed for.

SECTION=a distinct portion of the text and/or graphics that is displayed onto computer terminal screens.

FRAME=a visual border to delimitate one or more headings, labels, boxes, buttons, sections or any text that is displayed as a table-like structure.

SCREEN=the ensemble of all text and/or graphics that is displayed on the computer terminal screen at any given moment.

HEADING=the text at the head of a frame, screen, or the like, that provides a summary statement of the information, which will be displayed following that heading, or the status of the information system at a particular time throughout its operational functionality.

TEMPLATE=a computer file that contains the styles, shapes, number, and settings for the individual frames, including the components thereof, as well as the overall format and content of the screens that will be opened by that template.

Figure 1:
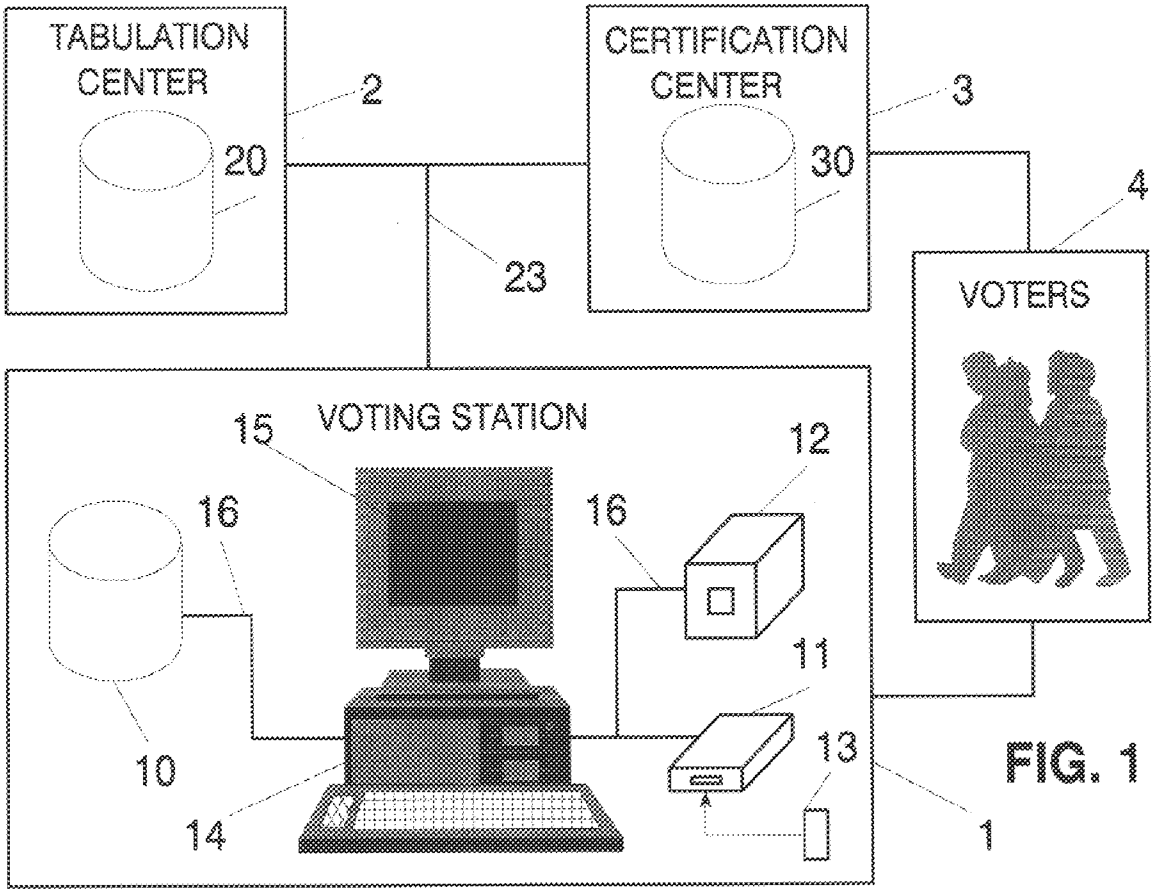

FIG. 1 is a block diagram that illustrates a typical systems environment whereby one or more voting stations interface with several certification centers, tabulation centers, and voters alike.

Figure 2:
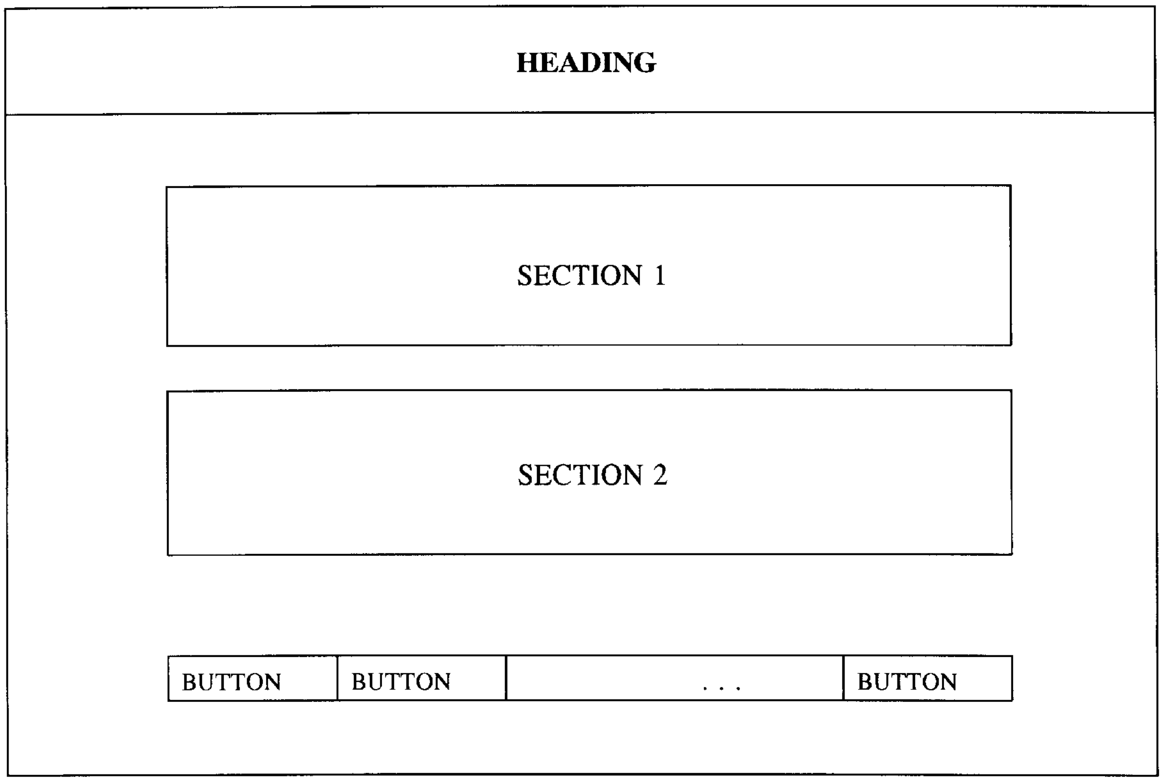
Figure 3:
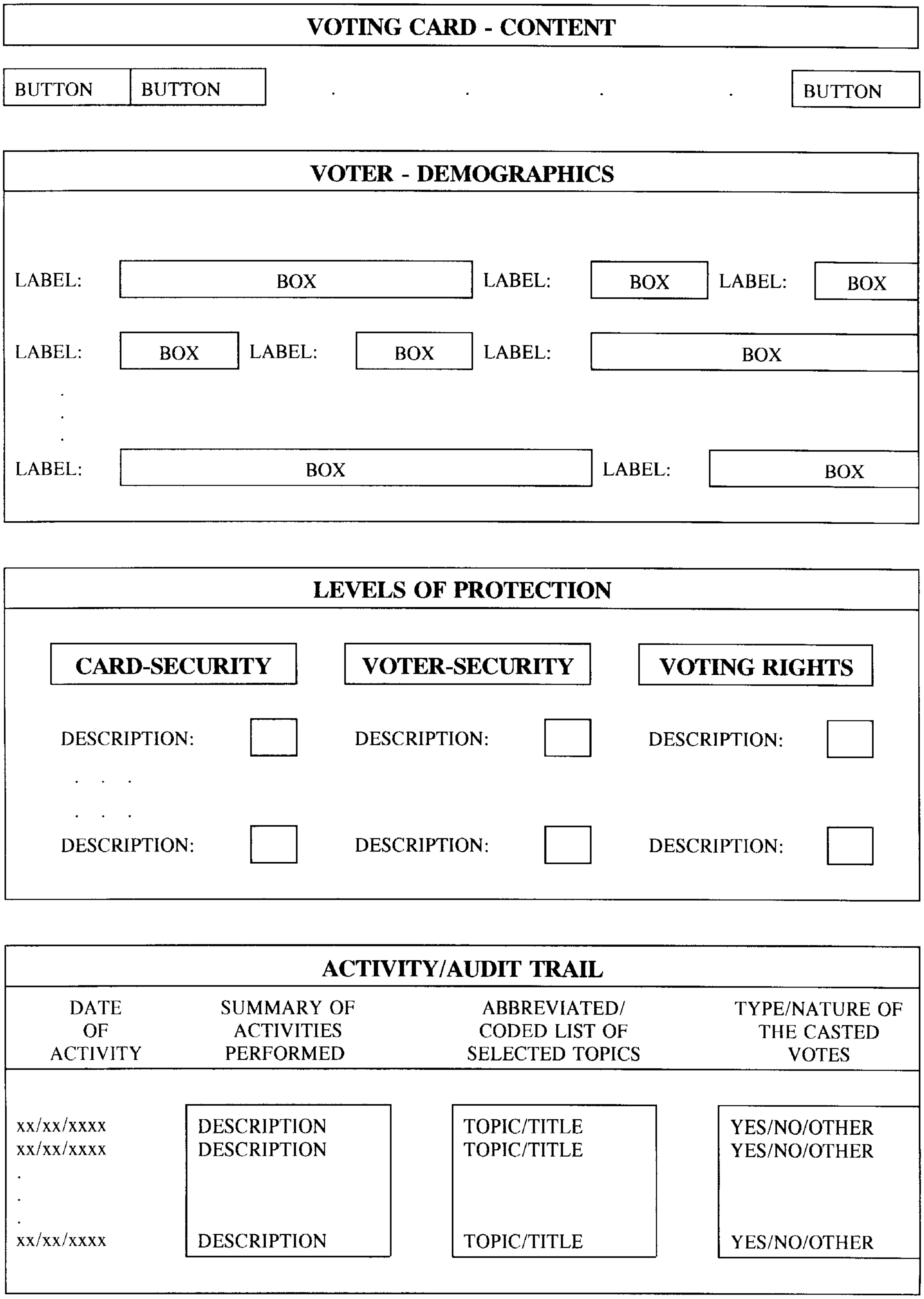
Figure 4:
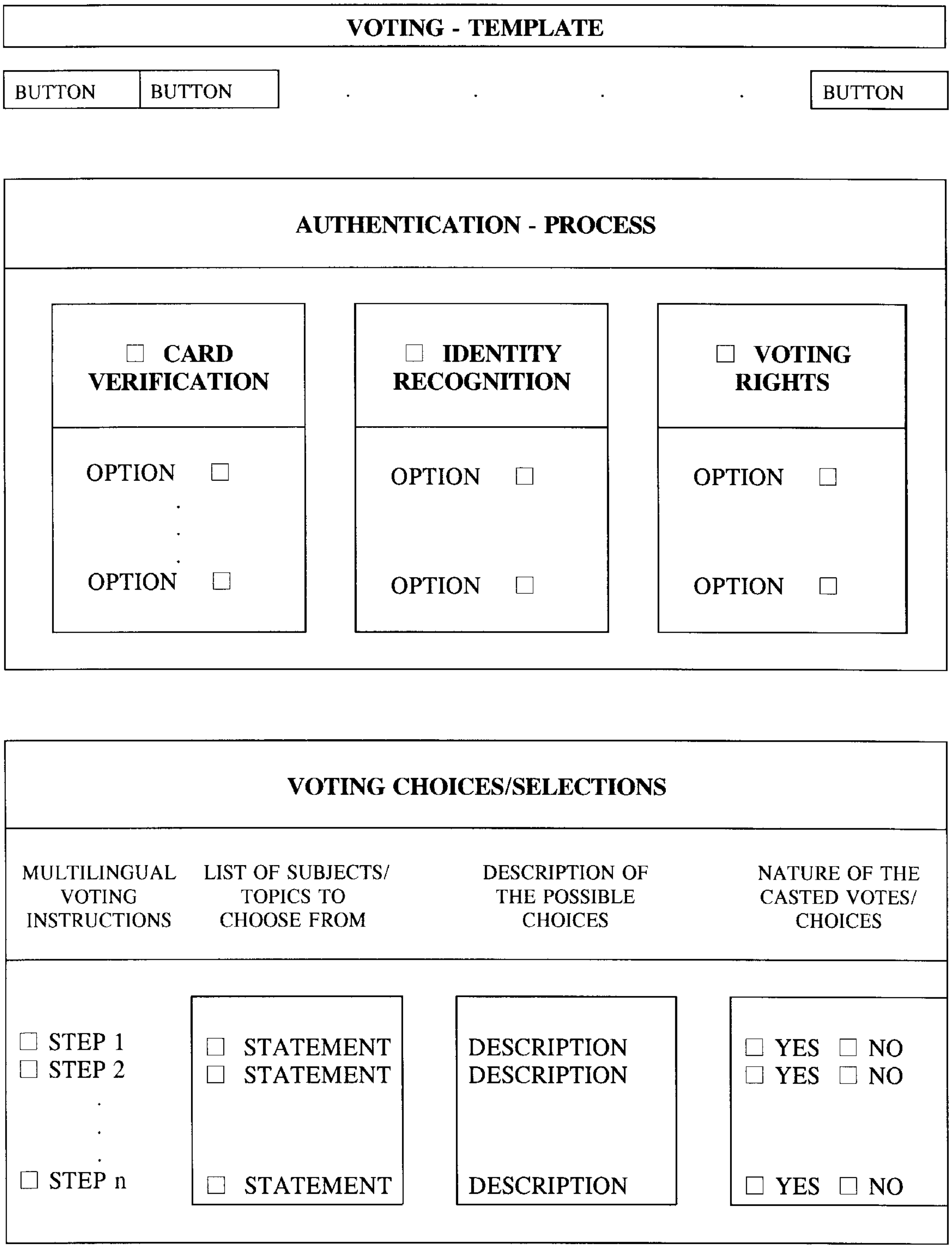
Figure 5:
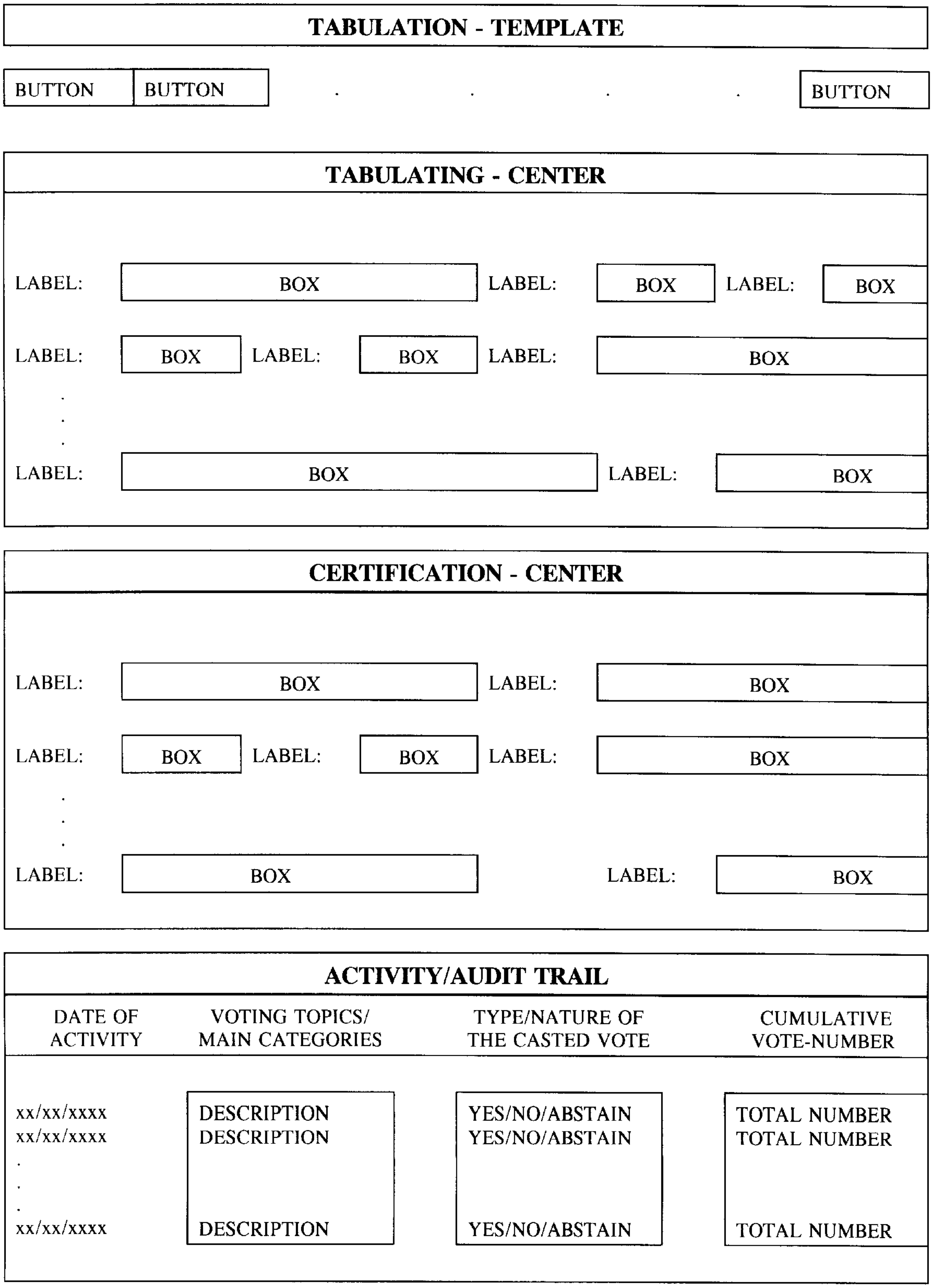

FIG. 2 through FIG. 5 illustrate the various predefined, tailored templates that will be used by the system and/or displayed on the computer terminal screen: FIG. 2 visualizes the format and content of pop-up and/or pull-down menus that will be displayed onto the terminal screen: Section 1 explains the status of what happened as a result of a particular command, function or process being executed. Section 2 describes the available choices and recommendations about how to proceed within the operational program, as well as the outcomes that are associated therewith. FIG. 3 shows the template structure that will be used to display and manipulate the voter data, security features, and other voting-related information within a format suitable to be loaded into, or retrieved from, the voting card and one or all of the databases. The demographics section includes data such as the voter's name, SSN (Social Security Number), and address. The levels of protection section contains the data and information that is related to the different security schemes employed by the voter card, the voter per se, and the voter's eligibility to participate in a particular voting event. In other words, these data will define the right to access the card (i.e. via PIN, fingerprint, etc.), the additional security features a voter may want to employ to protect his/her card (i.e. a particular biometrics), and the voting events the voter is eligible to cast his/her vote for/against (i.e. presidential elections in the USA). The audit trail section stores a short history of the voting activities that particular voting card was used for. Such a non erasable proof is as follows: "Jun. 07, 1994—primary election—city/chief of police—YES." FIG. 4 illustrates the structure to be used by the voters for the actual voting process when arriving at the voting station to cast their votes. The authentication process section starts the dialogue with the voter while requesting the voter to select the security options to be used during the authentication process. Once selected, the system verifies the voter card, recognizes if the voter actually is who he/she says, and if the voter still is eligible for that particular voting event. In other words, the system checks if the card is authentic, compares the biometrics that are stored within the card with the voter's "life" biometrics, and makes sure the voter is eligible to vote but also that he/she hasn't already voted in that particular election. The voting choices section will be enabled only if the previous authenticity checks are successful. The voter may then browse through the actual voting activities, and cast his/her preferred voting selections, while following the instructions that will be displayed onto the computer screen. The audit trail section stores a short history of the voting activities that particular voting card was used for. Such a non erasable proof is as follows: "Nov. 07, 1994—State Proposition 1A—Proposed Tax Exclusion/$10 Million losses in local taxes—NO." FIG. 5 is related to the tabulation process that is used by the tabulation center to collect and tabulate all votes. This can be done in a real-time manner or at predetermined dates by any entity that is authorized to do so. The tabulation and certification center sections identify the appropriate centers that will tabulate the casted votes and that has certified the voter card. The audit trail section stores the history of the tabulation activities and a non-erasable proof of how many votes ware casted during a particular voting event and with respect to which voting subject. An example of such an audit trail is as follows: Nov. 11, 1994—J. C. Smith/State Senate—YES=7,543,198/NO=1,273,542/Abstain=125,742.

Figure 6A:
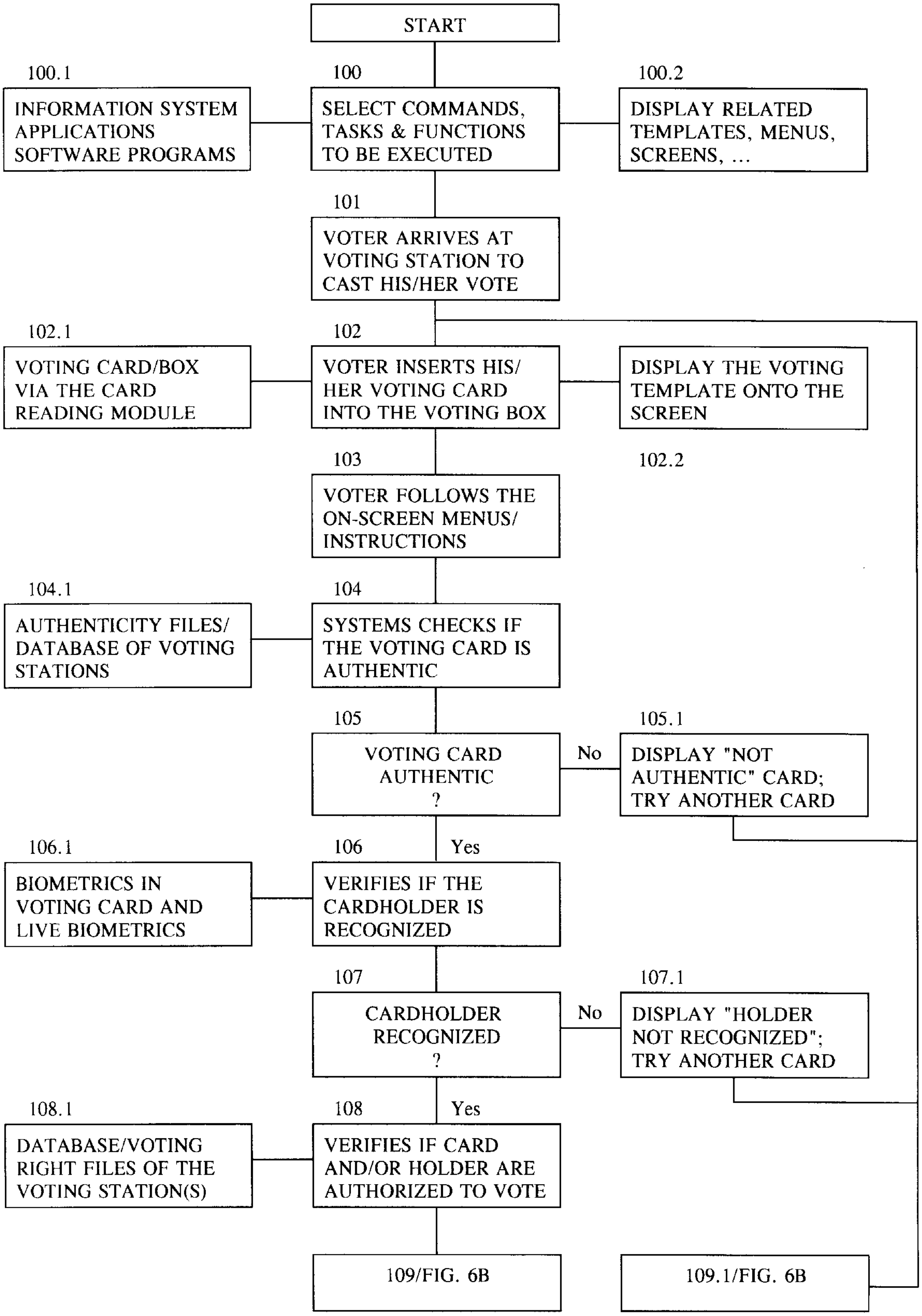
Figure 6B:
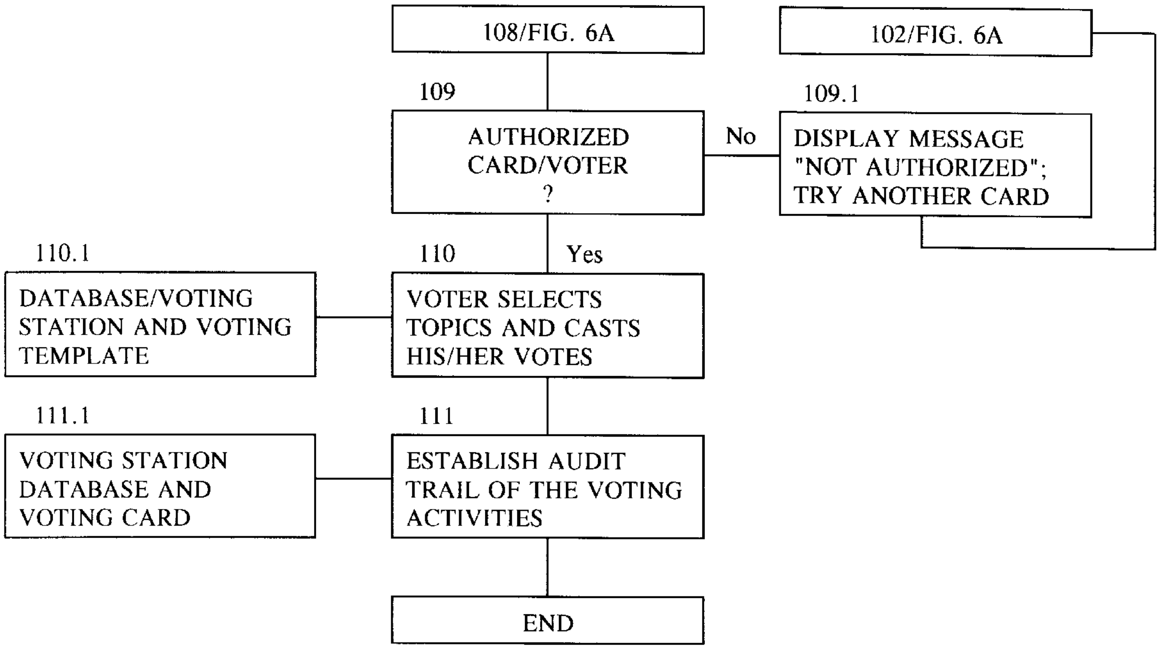
Figure 7:
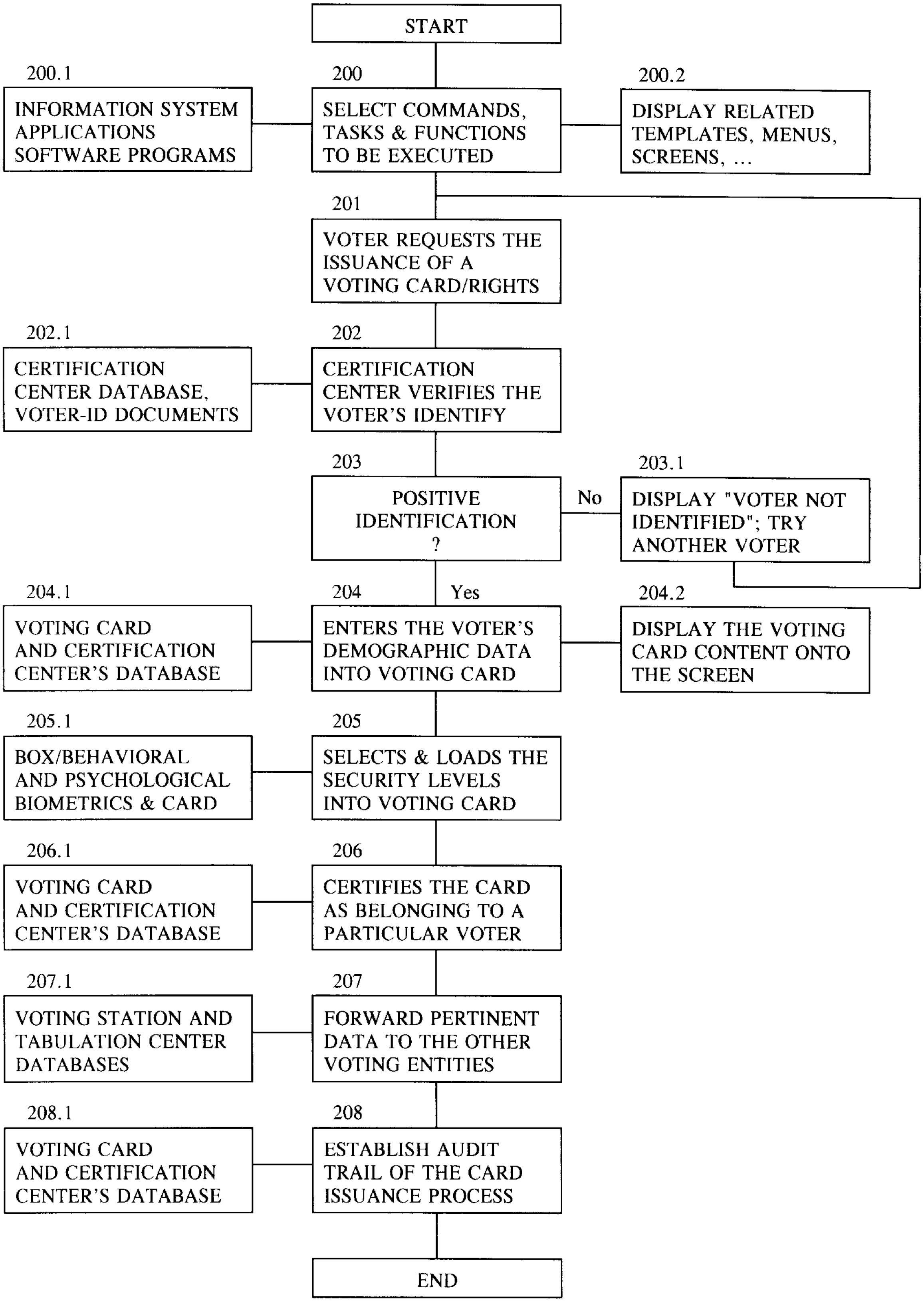
Figure 8:
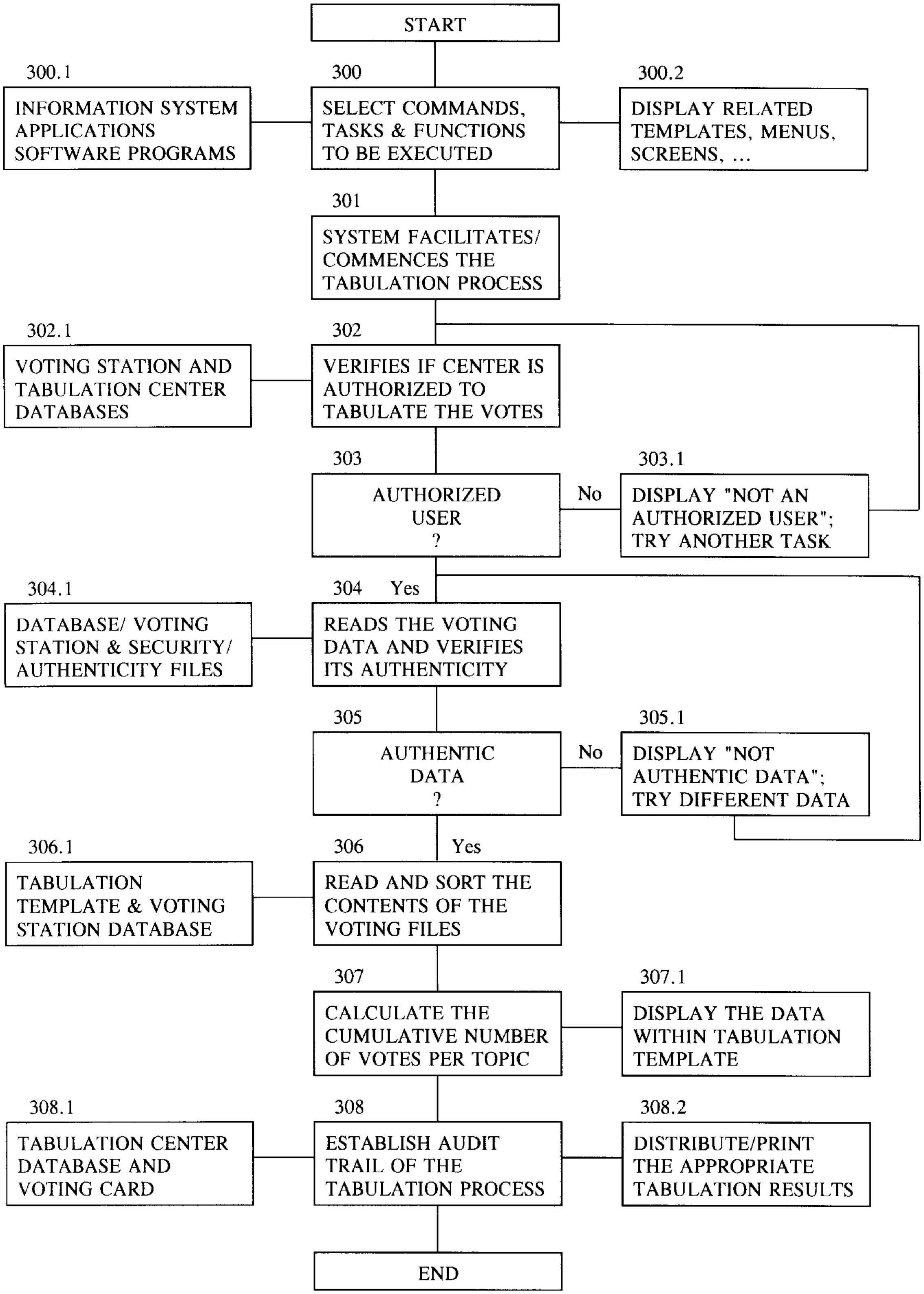

FIG. 6 through FIG. 8 illustrate the flow chart of the process performed by an embodiment of a system according to the present invention: FIGS. 6A and 6B describe the flow chart for the process that automatically verifies the voter's card, including the data that is stored therein, and provides the guidelines and methodology needed by the voter to cast his/her voting selections when arriving at the voting station. FIG. 7 illustrates the flow chart for the process that facilitates the certification of the voter card, including the loading of security data into the card and data exchange with the other voting entities. FIG. 8 shows the flow chart for a process that automatically tabulates the casted votes and summarizes the findings thereof.

DESCRIPTION OF A PREFERRED EMBODIMENT

FIG. 1 depicts the major components of a preferred system in accordance with the principles of the invention. This block diagram illustrates the major voting entities that are interacting within the computerized voting information system ("system"). The voting station 1 encompasses a plurality of physical locations, such as office or residential buildings, where the voters can cast their votes. The tabulation center 2 represents a variety of voting entities, such as government or private organizations, that are authorized to collect and tabulate the casted votes. The certification center 3 encompasses official entities, such as government agencies or private representatives, that are empowered to act like a public notary service to certify the voting cards. The voters 4 represent the individuals that are entitled to participate in a particular voting process and/or any other survey.

The Databases 10, 20 and 30 correlate to the appropriate voting entities, such as voting stations 1, tabulation centers 2 and certification centers 3 respectively. These databases contain the data records and all appropriate information, as well as the template files that are needed to implement the system's operational functions, including communications and data security management. The smart card reader 11 allows the PC-machine 14, or any other computer terminal, to read data from, or to write data into, the voting card 13 that is inserted, or placed in the vicinity of, the smart card reader. The biometrics box 12 allows the PC to capture the biometrics characteristics, such a fingerprints, voice, digital signature or retina of a particular cardholder, so that the system can compare this biometrics data with the one stored in the system's databases or voting cards. The PC-machine 14, which is shown as a point-of-voting station for the voting station 1, represents any number of such stations that can be stand alone stations or configured as client-server networks, or an integral part of mainframe-based MIS (Management Information Systems) computer platforms that are located at the premises of any of the voting stations. The PC-monitor 15, or any other computer terminal screen, represents the media for displaying any data, including text and graphics, onto the PC-screen. The link 23 between the major voting entities and databases per se, as well as the link 16 between the local systems components, can be implemented by any commercial available wire-based or wireless communications technology, including telephone and modem equipment.

The basic feature of the voting system is that the distributed databases 10, 20 and 30 always will contain the same data that is required to qualify a voter for voting purposes as well as the results of the casted votes. The availability of the latest data is guaranteed by the system's build-in mechanism of exchanging data in a real-time manner. In other words, if changes or voting activities are performed by or at any of the voting entities, all other entities will be automatically receiving this new data. Such an incremental exchange is not only fast and reliable, but also cost effective because of significant lower communications expenditures. In addition, the voting card, which can act as a portable database and/or off-line processing unit, also will free the system from lengthy and costly on-line modus of operandi while providing the bridge for stand alone and/or incompatible systems configurations. In the above systems context, FIG. 6 through FIG. 8 that illustrate the flow charts describing in more detail the operations of the information system in FIG. 1, will now be considered:

Starting with FIG. 6A, block 100 indicates that a system user can instruct the voting system to perform the voting process and to select and execute a variety of operational functions under the auspices of the applications program, as shown by block 100.1, and the assistance and guidance of the command buttons, template files (i.e. shown by FIGS. 2 through 5) and pull-up/pop-down menus (FIG. 2 depicts, for example, such a menu in more details), as shown by block 100.2.

Block 101 indicates that the voter will present his/her voting card to a representative at the voting station when arriving for voting purposes. The representative directs the voter to an available station (i.e. desktop or portable PC). As shown by block 102, the voter inserts the voting card into, or positions the voting card in the vicinity of, the card reader. Block 102.1 connects the voting card with the information system and block 102.2 displays the voting template, which is illustrated in FIG. 4, onto the PC-screen. Starting with block 103, the voter follows the menus and instructions that are associated with the voting process. First, block 104 checks the voting card's authenticity to see if the card conforms to the authenticity file shown by block 104.1 and has no fraudulent components. Block 105 implements this check while verifying the voting card's certification number, and as shown by block 105.1, cautions the system user that the voting card is not authentic if the check fails. Second, if the check is successful, block 106 will verify the cardholder's legitimacy while comparing one or more of the cardholder's biometrics characteristic (i.e. fingerprints, voice, signature, retina, etc.) against the corresponding biometrics that are stored within the voting card per se. In addition, the cardholder's identity can be visually verified (i.e. to match the picture and/or name on the drivers license with those imprinted onto the voting card). As shown by block 106.1, the cardholder's biometrics will be captured via the biometrics box for the above comparison. Therefore, this off-line method of verifying the voter's biometrics, makes sure that the voter who is presenting the voting card, actually is the legitimate cardholder. On-line authorization calls, on the other hand, can only verify that the voting card is authentic. Block 107 determines if the comparison is successful or not: If not, then block 107.1 flags the fact that the card bearer is not the legitimate cardholder. If successful, then a third authentication check is performed. Block 108 will verify if the voter is eligible to participate in that particular voting campaign. In other words, block 108.1 will inquiry the voting station's database to see if the voter is eligible to vote at this time and whether the voter has already voted in that election. Starting with FIG. 6B, block 109 will verify the appropriate eligibility. If not eligible, then block 109.1 will display the message about the voter not being eligible to vote and the system will stop and flag the voting station to proceed with another voter. If eligible, then block 110 will proceed with the actual voting activities while providing the related instructions and allowing the voter to cast his/her voting choices. Block 110.1 supports these activities and provides the necessary data, information, and templates. At this time, block 111 automatically establishes an audit trail concerning the voting process and communications exchange of voting data. A "who did what-when-where" audit trial will be stored by the system as a means of record-keeping and proof that a particular voter was qualified by that voting station to caste his/her votes, voting selections were made by that voter, and voting data was loaded into the database of the voting station and the voting card as well as forwarded and received, together with a time stamp, by the other voting entities (i.e. tabulation and certification centers). In this context, whenever a voting entity performs changes and/or updates to existing information, the other voting entities, including the voting card, will automatically receive this new data in a real-time manner via the communications lines they are connected to or via the portable voting card. In this way, a network of individual databases acts and behaves as being a single database but with improved reliability (i.e. no redundant data, complete information, no obsolete data, etc. ), increased efficiency (i.e. real-time access to data, automated manipulation of data, etc.) and reduced cost (i.e. less communications time, easier to install and maintain, less personnel, etc.) as compared to a large, centralized database. Block 111.1 provides the database of the voting station and the voting card for the above audit trail. At the same time, the voting status of that particular voter will be updated, both in the voting station's database and voting card per se, so as to inhibit the voter from casting multiple votes in the same election. In the context of the voting process previously described, the voting activities can be performed also at the voter's home provided there is a PC and on-line communications link to a voting station present.

Starting with FIG. 7, block 200 indicates that a system user can instruct the information system to perform the certification process and to select and execute a variety of operational functions under the auspices of the applications program, as shown by block 200.1, and the assistance and guidance of the command buttons, template files (i.e. shown by FIGS. 2 through 5) and pull-up/pop-down menus (FIG. 2 depicts, for example, such a menu in more details), as shown by block 200.2. The herewith described process represents the foundation for the system's competitive advantage, including security features and cost effectiveness. The certification center will make sure that the voters are who they say they are, certify all voting cards by loading one or more of the voter's biometrics characteristics into the voting card, and electronically inform all voting stations and tabulation centers about the existence and voting eligibility of that voter. In this way, whenever the voter arrives for voting purposes, the voting station does not have to manually/visually verify the legitimacy of that voter. In other words, rather then relying upon a centralized voting database that is difficult and expensive to maintain and update, the invention will use a decentralized concept that is based upon distributed voting capabilities. Therefore, the resulting process is not only secure, due to the tamper proof voting cards, but also cost effective, due to personnel savings and less paperwork.

Block 201 indicates that the voter arrives at the certification center to have a card issued or new/additional voting rights loaded into his/her voting card. As shown by block 203, the certification center starts the certification process with the verification of the voter's identify. Block 202.1 provides the necessary data, such as the voter's drivers license/SSN card and government database, that is needed for this verification process. Block 203 performs this verification process and if successful, then block 204 will proceed, otherwise block 203.1 display the message that the voter couldn't be identified and no card can be certified for that voter. In the case of a positive identification, block 204 allows the entry of the voter's demographics data into the voting card within the section entitled 'Voter-Demographics." Block 204.1 provides the voting card per se and the appropriate data from the database of the certification center. Block 204.2 displays the voting card template and means to support this data entry process. The loading of the appropriate levels of protection is next. Block 205 allows the entry of these security data into the voting card within the section entitled "levels of protection." The card-security data relates to the method of protecting the access to the voting card, the voter-security data to additional protection levels the voter may want to load into the voting card, and the voting-rights data to the elections the voter is eligible to participate within. Block 205.1 provides the voters psychological and/or behavioral characteristics, such as fingerprints, eye, signature, voice, etc., that will be loaded via the biometrics box into the voting card. This biometrics data is tamper proof and can be changed only by the certification center. After the data relating to the voter and the levels of protection is loaded into the voting card, the certification center will load, as shown by block 206, a secret certification number into the voting card that is unique, not erasable, and invisible but to the certification center. Block 206.1 provides the voting card and the database of the certification center for this certification number. This number will be used also by the voting stations to authenticate the voting card. As shown by block 207, after all data is loaded into the voting card, the certification center will forward the certification number and related data to the other voting entities so as to inform them about the existence of a legitimate voting card. Block 207.1 provides the databases of the tabulation and certification centers for the forwarded data. At this time, block 208 automatically establishes an audit trail concerning the certification process and communications exchange of the above data. A "who did what-when-where" audit trial will be stored by the system as a means of record-keeping and proof that a proper voting card was issued to an qualified voter and appropriate data was loaded into the database of the certification center and the voting card as well as forwarded and received, together with a time stamp, to the other voting entities (i.e. voting station and tabulation center).

Starting with FIG. 8, block 300 indicates that a system user can instruct the information system to perform the tabulation process and to select and execute a variety of operational functions under the auspices of the applications program, as shown by block 300.1, and the assistance and guidance of the command buttons, template files (i.e. shown by FIGS. 2 through 5) and pull-up/pop-down menus (FIG. 2 depicts, for example, such a menu in more detail), as shown by block 300.2. The herewith described method and process facilitates the collection and tabulation of the casted votes. The tabulation center can tap into the database of the voting stations at any time and retrieve the voting data the tabulation center is authorized to collect and process.

Block 301 indicates the beginning of such a tabulation process with regards to collecting, tabulating, and distributing the voting results. Block 302 verifies if the tabulation center is authorized to manipulate the voting data of that particular election. As indicated by block 302.1, the tabulation center's authorization file will be sending an inquiry to the voting station the votes are requested from. Block 303 performs this verification to see if the tabulation center is authorized to tap into the voting data of the voting station. If this verification is not successful, then block 303.1 will display the message about not being authorized to tabulate the votes. If this verification process is positive, then block 304 will proceed with reading the voting data and verifying if the data is authentic. Block 304.1 shows the databases of the voting station and that of the tabulation center that provide the necessary information for this check-and-balance. In this way, the tabulation center also can determine if the voting data does not come from an authorized voting station or if the data was tampered with in transit. Block 305 provides the findings of this verification process and informs accordingly. If the verification was unsuccessful, then block 305.1 will display the message to disregard the voting data and to retrieve a different data. If the verification was successful, then block 306 will proceed and read the entire voting data and tabulate it accordingly. Block 306.1 provides the data-source for this tabulation task, such as the tabulation template and the voting station. Block 307 will calculate the cumulative number of the votes and group them with respect to the voting selections. As shown by block 307.1 these findings will be displayed within the tabulation template. If the tabulation is accomplished, an appropriate audit trail will be established by block 308 to proof the completion of the tabulation process as well as when and from where the voting data was retrieved and to whom it was forwarded. As shown by block 308.1, an appropriate audit trail will be stored within the tabulation center's database as well as loaded into the voting card. Last but not least, block 308.2 indicates that the system will display and distribute the tabulation results as necessary.

What is claimed is:

1. A portable voting card, comprising:

database storage means for storing voting data in said portable voting card issued to a voter; said voting data comprises:

voter demographics data;

security data including card access control information, data protection schemes, and voting eligibility data for said voter; said card access control information comprising a personal identification number to prevent unauthorized use of the card; and audit trail data including information about the status of votes casted by said voter;

data input/output means for inputting said voting data in and for retrieving the data from the card;

a predefined content template, comprising:

a demographics data section including a predetermined arrangement of the voter's personal data elements;

a protection data section including a predetermined arrangement of data elements; said data elements comprising:

card security data to control usage of the card;

voter security data to authorize access to a particular card data element; and voting right data to qualify said voter for voting services; and a voting activity data section including an audit trail of the activity performed via the card; said audit trail comprising:

the date of the activity being performed;

a description of the activity;

the particular topics the activity relates to; and the kind of vote casted during the activity; and a predefined voting template, comprising:

an authentication process section including a predetermined arrangement of a plurality of options comprising:

card verification option to authenticate the card;

voter recognition option to identity said voter; and voting rights option to validate said voter's voting eligibility; and a voting choices section, comprising:

voting instructions;

list of voting topics to select from;

description of the impact associated with a particular selection being made; and the options available to cast a particular vote.

2. The card in claim 1 wherein said portable voting card is a smart card comprising a memory for storing said voting data including said predefined templates.

3. The card in claim 2, further including processing means for performing arithmetic and logical operations on said voting data including said predefined templates.

4. The card in claim 1 wherein said data input/output means comprises:

means for compiling a plurality of data elements from among the inputted data;

means for storing the compiled data elements into the content template or voting template;

means for locating a particular template data element; and means for retrieving the located data element from said particular template.

5. The card in claim 1, further including means for displaying the card data onto said predefined content template or said predefined voting template.

6. The card in claim 5, further including means for coupling via a data communication link the card to an external database to exchange at least a portion of said voting data between the card and the database; said data exchange comprising means for detecting and interchanging incremental changes/updates performed to data elements stored in or displayed onto the card templates.

7. The card in claim 6, further including means for loading a certification number into the card to authenticate a particular voting card including said voting data stored in the card, comprising:

means for storing by a certification center said certification number tamper-proof in the card; and means for communicating said certification number to a plurality of remote voting stations that are authorized to provide voting services to said voter.

8. A method for voting, comprising:

authenticating the identity of a person by a certification center, including:

determining at least one voting right said person is eligible for; and storing said person identity and said voting right in a portable voting card;

validating, by the center, the data stored in the card with a certification number and storing the number tamper-proof in said portable voting card;

communicating via a data communication link said certification number to a plurality of remote voting stations said person is eligible to receive voting service from;

issuing said portable voting card to said person;

presenting at a later time said portable voting card to a voting terminal located at any particular one of said plurality of remote voting stations:

comparing said certification number stored in the card against the number communicated by said public certification center to said particular voting station; and accepting said person for said voting service if the two numbers match or denying service requested via the card if the numbers don't match;

said person identity and said voting right in the card comprising:

storing a predefined content template in the card, including:

inputting voter demographics data into the template;

inputting card security data into the template to control use of the card by said person;

inputting voter security data into the template to control access of said person to a predetermined set of card data elements;

inputting voting right data into the template to define the services said person is eligible to receive via said portable voting card; and inputting audit trail data into the template to establish proof of said voting service being rendered to said person; and storing a predefined voting template in the card, including:

compiling from among the inputting content template data a plurality of authentication options, comprising a card verification option, a voter identification option and a voting rights option; and storing the compiled options as a predetermined arrangement of data elements within the voting template.

9. The method in claim 8 wherein comparing said certification number further comprising:

displaying said plurality of authentication options onto said predefined voting template;

selecting a particular authentication option and verifying the card including identifying the person presenting the card for service, and if verifying and identifying are successful then: displaying said voting right said person is eligible to exercise via the voting card and accepting said person for said voting service; and otherwise: denying service requested via the voting card.

10. The method in claim 9 wherein accepting said person for said voting service further comprising the step of determining if said person is still eligible to receive a service requested via a particular voting right, including if said service is documented by said audit trail data as being already rendered; and if still eligible then: displaying onto the voting template a plurality of choices available for said requested service;

selecting any of said plurality of choices and loading the choice into the content template;

documenting the rendering of said service including updating the card's audit trail data to reflect said service being provided; and communicating to all voting stations authorized to accept said person for said requested service that the service has been rendered to said person; and otherwise: denying the rendering of said requested service or selecting a different voting right.

11. The method in claim 10 wherein displaying onto the voting template a plurality of voting choices available, further comprising:

displaying voting instructions relating to the choices available for said requested service;

displaying a list of voting subjects and topics to select from;

displaying explanations about the impact associated with a particular selection being made; and displaying the type of voting possible for a particular voting choice.

12. A system for remote voting, comprising:

a plurality of remote voting stations authorized to render a voting service to a voter;

a data communication link between and among said plurality of remote voting stations including between the voting stations and an electronic terminal said voting service can be provided on-line; said electronic terminal being remote from the voting stations;

data input/output means for inputting data into or retrieving data from a portable voting card issued to a voter;

database storage means for storing voting data in said portable voting card; said voting data comprising:

a predefined content template including voter demographics data, card and voter security data, voting eligibility data, and audit trail information about the activity performed via the card; and a predefined voting template including card verification data, voter identification data, voting rights data, and voting selection information about the choices available to said voter;

a certification center qualifying said voter for remote voting including storing a certification number in said portable voting card;

data communication means for communicating said certification number to said plurality of remote voting stations;

means for selectively coupling at a later time said portable voting card to said electronic terminal;

means for logging-on via said electronic terminal to any particular one of said plurality of remote voting stations; said log-on means comprising:

means for displaying onto said electronic terminal said predefined voting template;

means for verifying on-line the card's authenticity and the voter's identity; said verification means comprising:

means for comparing said certification number stored in the card against the number forwarded by said certification center to said particular remote voting station;

means for accepting said voter for on-line voting service if the comparison is successful; and for denying service if the numbers don't match;

means for retrieving from said particular voting station a set of voting information associated with said on-line voting service;

means for displaying the voting service information onto the voting template and for selecting from among the displayed information the service including an absentee vote to be rendered;

means for verifying said audit trail data stored in the content template to determine if said absentee vote wasn't already casted by said voter; and means for communicating the status of the rendered service including said absentee vote casted by said voter to said plurality of remote voting stations including said particular voting station; and means for loading the service activity status data including the casted vote into said predefined content.

13. The system in claim 12, further including a data communication link between said certification center and said electronic terminal for communicating voting rights eligibility information and for inputting via said data input/output means the communicated information into said portable voting card.

14. A voting system, comprising:

a plurality of remote databases including a certification database maintained by a certification center, a voting database maintained by a voting station, a tabulation database maintained by a tabulation center, and a portable database maintained by said certification database, said voting database, and said tabulation database; said portable database being included in a portable voting card issued to a voter;

data communication means linking said plurality of remote databases into an integrated communications network;

database storage means for storing voting data including voting rights qualifying said voter for a voting service in a distributed manner between and among said plurality of remote databases;

a data input/output device for inputting data into or retrieving data from the remote databases;

a data display device for displaying data stored in, inputted into, or retrieved from the individual databases;

decision logic means for validating authorization of said voter to receive said voting service based on the verification of information stored in the card presented to a particular voting station; said decision logic means including:

means for verifying a certification number stored previously in the card by said certification center against a corresponding certification number communicated by the center to and stored in said voting database; and means for accepting the card for service if the card number matches the database number; and for denying service if the numbers don't match; and means for automatically communicating changes or updates made to said voting data between and among said plurality of remote databases in real-time whenever the data changes/updates are performed in any particular one of said plurality of remote databases, so that each of the remote databases including the card is updated in real-time and automatically in response to said data changes/updates performed to contain the same and most current set of data for said voting data;

said database storage means further comprising:

means for storing a predefined content template in said portable voting card, including:

means for compiling from among said voting data a set of voter information including voter demographics data, card security data, voter security data, voting eligibility data, and audit trail data; and means for inputting said set of voter information into the content template;

means for storing a predefined voting template in said portable voting card, including:

means for compiling from among the content template data a set of authentication information including card verification data, voter identification data, and voting right data; and means for inputting said set of authentication information into the voting template;

means for validating, by said certification center, the inputted data and for communicating said validation data including said certification number to said voting station including said particular voting station and said tabulation center; and means for loading said certification number into said portable voting card.

15. The system in claim 14 wherein said portable voting card is a smart card comprising a memory for storing at least a portion of said voting data including said certification number used to authenticate the card for said voting service.

16. The system in claim 14 wherein said decision logic means for authorizing said voting service further comprises:

means for displaying said predefined voting template;

means for verifying said set of authentication information stored in the card against an authenticity file and a voting rights file stored in said voting database; and means for qualifying said voter for said voting service if the verification is successful; said qualification means comprising:

means for displaying onto the voting template a plurality of voting choices relating to the authorized voting service; said plurality of voting choices including voting instructions, voting subjects to select from, and explanations of the impact associated with a particular voting choice;

means for selecting any particular one of said plurality of voting choices and for storing the selected choice in said predefined content template; and means for communicating proof of service being rendered and of voting performed to said plurality of remote databases; and means for loading said selected particular voting choice into said portable voting card including for storing the content's template audit trail data section proof of a particular vote being casted.

17. The system in claim 16, further including:

means for verifying if said voter has already received said voting service including already voted at any voting station including said particular voting station; said verification means comprises verifying the card audit trail data to determine if said voter is still authorized to vote; and means for denying service including voting by said voter if the service was previously rendered to said voter.

18. The system in claim 14 wherein said communication means further comprises:

means for communicating voting data entries or an accumulation of entries made in a particular database to any of said plurality of remote databases not coupled to said particular database at the time of said initial data entries;

means for selectively coupling a remote database to said particular database and for comparing the particular database data with the remote database data; and means for automatically updating said remote database with the particular database data if a discrepancy is detected between the compared data including between a data element stored in said particular database and the corresponding data element stored in said remote database.

19. The system in claim 14, further including means for tabulating the rendered services including votes casted at said voting station, said tabulation means comprising:

means for displaying a predefined tabulation template, including:

a tabulation center section comprising a predetermined arrangement of data elements relating to said tabulation center;

a certification center section comprising a predetermined arrangement of data elements relating to said certification center; and an audit trail section comprising a predetermined arrangement of data elements relating to said voting service provided including the votes casted by voters;

means for querying, by said tabulation center, a predefined set of voting data stored at said particular voting station;

means for determining if said tabulation center is authorized to retrieve the voting station data and for retrieving the data if authorized;

means for verifying if the retrieved data is authentic including if the data originates from an authentic voting station and if the data was not tampered with during transit;

means for compiling from among the retrieved data a summary of voting activities performed and for storing said summary into the tabulation template;

means for displaying the tabulation template data and for communicating the tabulated data to said voting station and said certification center; and means for storing and for maintaining audit trail data within the tabulation template; said audit trail data comprising a cumulative amount of all votes casted during a particular voting event including a breakdown of the votes per voting issue.

* * * * *